United States Patent
Luan et al.

(10) Patent No.: US 12,006,412 B2
(45) Date of Patent: Jun. 11, 2024

(54) REACTION MIXTURE SUITABLE FOR MANUFACTURING OF FOAM WITH REDUCED ALDEHYDE EMISSION

(71) Applicant: Huntsman International LLC, The Woodlands, TX (US)

(72) Inventors: Bao Luan, Shanghai (CN); Zuxia Rong, Shanghai (CN); Yuefan Zhang, Shanghai (CN); Lies Bonami, Aalter (BE); Joris Bosman, Herselt (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 125 days.

(21) Appl. No.: 17/414,134

(22) PCT Filed: Dec. 21, 2018

(86) PCT No.: PCT/CN2018/122735
§ 371 (c)(1),
(2) Date: Jun. 15, 2021

(87) PCT Pub. No.: WO2020/124569
PCT Pub. Date: Jun. 25, 2020

(65) Prior Publication Data
US 2022/0081526 A1 Mar. 17, 2022

(51) Int. Cl.
| | | |
|---|---|---|
| C08G 18/16 | (2006.01) | |
| C08G 18/18 | (2006.01) | |
| C08G 18/32 | (2006.01) | |
| C08G 18/48 | (2006.01) | |
| C08G 18/66 | (2006.01) | |
| C08G 18/76 | (2006.01) | |
| C08J 9/00 | (2006.01) | |
| C08J 9/12 | (2006.01) | |
| C08K 5/00 | (2006.01) | |
| C08K 5/08 | (2006.01) | |
| C08K 5/132 | (2006.01) | |
| C08K 5/1535 | (2006.01) | |
| C08K 5/1545 | (2006.01) | |
| C08L 75/04 | (2006.01) | |

(52) U.S. Cl.
CPC .......... *C08J 9/0023* (2013.01); *C08G 18/18* (2013.01); *C08G 18/3275* (2013.01); *C08G 18/4841* (2013.01); *C08G 18/6688* (2013.01); *C08G 18/7671* (2013.01); *C08J 9/125* (2013.01); *C08K 5/132* (2013.01); *C08K 5/1535* (2013.01); *C08K 5/1545* (2013.01); *C08G 2110/0083* (2021.01); *C08J 2203/10* (2013.01); *C08J 2375/12* (2013.01)

(58) Field of Classification Search
None
See application file for complete search history.

(56) References Cited

U.S. PATENT DOCUMENTS

| | | |
|---|---|---|
| 2006/0141236 A1 | 6/2006 | Nakamura et al. |
| 2009/0326089 A1 | 12/2009 | Haas et al. |
| 2016/0304686 A1 | 10/2016 | Martinez et al. |
| 2018/0171064 A1 | 6/2018 | Su et al. |

FOREIGN PATENT DOCUMENTS

| | | | |
|---|---|---|---|
| CA | 2808018 A1 | 8/2012 | |
| CN | 102741310 A | 10/2012 | |
| CN | 104629516 A | 5/2015 | |
| CN | 105026438 A | 11/2015 | |
| CN | 107750260 A | 3/2018 | |
| CN | 108383977 A | 8/2018 | |
| DE | 10003157 B4 * | 10/2006 | ............. B01J 20/26 |
| EP | 0564259 A2 * | 10/1993 | |
| JP | S6244580 B2 | 9/1987 | |
| JP | H05209077 A | 8/1993 | |
| JP | 2005082694 A | 3/2005 | |
| JP | 2005162920 A | 6/2005 | |
| JP | 2005162921 A | 6/2005 | |
| JP | 2017171728 A | 9/2014 | |
| JP | 2017036388 A * | 2/2017 | |
| JP | 2018517826 A | 7/2018 | |
| KR | 1020180018758 A | 2/2018 | |
| RU | 2518117 C2 | 6/2014 | |
| RU | 2558104 C2 | 7/2015 | |
| WO | 2008152543 A1 | 12/2008 | |
| WO | 2015082316 A1 | 6/2015 | |
| WO | 2015110403 A1 | 7/2015 | |
| WO | 2016201615 A1 | 12/2016 | |
| WO | 2017134296 A1 | 8/2017 | |
| WO | 2017207687 | 12/2017 | |
| WO | 2018145283 A1 | 8/2018 | |

OTHER PUBLICATIONS

Machine translation of JP-2017036388 obtained from the European Patent Office in Jan. 2023.*
Machine translation of DE-10003157 obtained from the European Patent Office in Jan. 2023.*
International Search Report in corresponding PCT Application PCT/CN2018/122735 completed Sep. 6, 2019 and dated Sep. 19, 2019.
Written Opinion in corresponding PCT Application PCT/CN2018/122735 completed Sep. 6, 2019 and dated Sep. 19, 2019.
Office Action issued Dec. 18, 2023 in corresponding Korean Application No. 10-2021-7022500 filed Jul. 16, 2021.

* cited by examiner

*Primary Examiner* — Melissa A Rioja
(74) *Attorney, Agent, or Firm* — Huntsman International LLC; Lewis Craft

(57) ABSTRACT

Disclosed is a reaction mixture for the manufacturing of a polyurethane foam, which mixture can be obtained by reacting a polyfunctional isocyanate with an isocyanate-reactive compound, in the presence of a scavenger and at least one catalyst; and curing such reaction mixture enables providing a foam with reduced aldehyde emissions particularly useful in means of transport, such as interior part of cars.

14 Claims, No Drawings

REACTION MIXTURE SUITABLE FOR MANUFACTURING OF FOAM WITH REDUCED ALDEHYDE EMISSION

CROSS-REFERENCE TO RELATED APPLICATIONS

This application is the National Phase of International Application PCT/CN2018/122735 filed Dec. 21, 2018 which is incorporated herein by reference.

FIELD OF THE INVENTION

The present invention relates to the manufacturing of polyurethane (rigid or flexible) foam with reduced aldehyde emissions, and more specially to polyurethane (PU) foam useful in means of transport such as interior part of cars.

BACKGROUND INFORMATION

Emission of formaldehyde and acetaldehyde can cause unpleasant odours and health related problems. Methods of reducing formaldehyde emissions in polyurethane or polyurea compositions by using scavenger additives are already known in the art.

US20160304686 discloses the use of acidic compounds as aldehyde scavengers in polyurethanes. But these compounds work only for reducing formaldehyde emission.

WO2017207687 discloses the use of aldehyde scavengers (amine compounds) to reduce aldehyde emission in PU foam. But some amine compounds may lead to strong color change of PU foam.

US2009326089 discloses the use of compounds which contains at least one carbonamide group and one nitrile group as aldehyde scavengers in polyurethanes. But these compounds work only for reducing formaldehyde emission.

US20060141236 discloses the use of hydrazine compounds as aldehyde scavengers in polyurethanes. But the viscosity of these compositions is very high.

However, known solutions are not able to provide PU foams, which can effectively reduce the formaldehyde, acetaldehyde and propionaldehyde emission.

There is therefore a need to provide a reaction mixture suitable for the manufacturing of PU foam with a simple, cost-efficient and improved process.

SUMMARY OF THE INVENTION

It has now been surprisingly found that the reaction mixture of the present invention enables providing a foam that has several advantages, including without being limited to: (1) reduced aldehyde emission, especially formaldehyde, acetaldehyde and propionaldehyde emission; (2) low cost; and (3) no obvious influence on the mechanic properties of the foam.

The present disclosure is concerned with a reaction mixture suitable for the manufacturing of a PU foam, and a process for the manufacturing of a PU foam by using a reaction mixture of the present invention.

The present invention relates to:
A reaction mixture for the manufacturing of a polyurethane foam, wherein the mixture can be obtained by reacting a polyfunctional isocyanate with an isocyanate-reactive compound, in the presence of a scavenger and at least one catalyst, wherein the scavenger comprises a compound of the following formula (I):

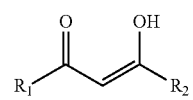

wherein,
R1 and R2 are independently of one another selected from —OR3, R4, or from the group consisting of hydroxy, ether, halogen, carbonyl, carboxyl, isocyanate, nitro and/or amine groups, $R_3$ and $R_4$ are independently of one another selected from a combination of linear, branched, saturated, unsaturated, cyclic and/or non-cyclic carbon chains, aliphatic hydrocarbons, araliphatic hydrocarbons, aromatic hydrocarbons and mixtures thereof, optionally interrupted by one or more oxygen atoms, nitrogen atoms and/or sulphur atoms, and optionally comprising any functional group selected from hydroxy, ether, halogen, carbonyl, carboxyl, isocyanate, nitro and/or amine groups, $R_1$ and $R_2$ may be linked to each other essentially forming at least one ring structure, preferably at least 2 ring-structure.

In another embodiment, the present disclosure provides a process for preparation of the foam compositions.

In still another embodiment, the present disclosure provides a method of using the foam compositions to form an interior part of a means of transport.

Advantageously, said scavenger predominantly contains said compound with formula (I), when added to the reaction mixture in aqueous condition.

This is advantageous since the scavenger, preferably present in solid form can be added to the reaction mixture in aqueous condition, where the scavenger mainly contains the compound of formula (I). It has been observed that compound with formula (I) is stable in the final composition and sufficiently reactive with aldehyde.

More advantageously, said scavenger is added to the reaction mixture at a temperature ranging from 18 to 45° C.

In a preferred embodiment of the present invention, R1 is —OR3, which enables increasing the efficiency of the final composition in terms of aldehyde emission reduction.

According to a specific embodiment of the present invention, said scavenger is made of at least 90 wt % of said compound of formula (I), preferably at least 95 wt %, more preferably about 99 wt %, based on the total weight of said scavenger.

Preferably, $R_1$ and $R_2$ are linked to each other to form a 5 to 12 membered ring structure and comprise unsaturations, aromatic rings and/or heteroatoms, preferably at least a 2 ring-structure.

More preferably, said scavenger has a molecular weight of at most 3000 g/mol, preferably below 1500 g/mol, more preferably below 500 g/mol.

In addition, the reaction mixture can comprise a blowing agent.

The polyfunctional isocyanate is preferably selected from a polymeric methylene diphenyl diisocyanate, a methylene diphenyl diisocyanate isomer mixture, or a mixture thereof.

The isocyanate-reactive compound is advantageously a polyfunctional polyol or a polyfunctional amine, preferably a polyfunctional polyol, and more preferably a polyether polyol.

In a preferred embodiment, the reaction mixture can comprise a chain extender and/or crosslinking agent.

Specific embodiment of the reaction mixture of the present invention will be detailed in the present application.

The present invention also relates to a:

Process for the manufacturing of a polyurethane foam, comprising the following steps:
  i. Providing a reaction mixture comprising a polyfunctional isocyanate and an isocyanate-reactive compound;
  ii. Adding a scavenger and at least one catalyst to said reaction mixture, eventually along with at least one blowing agent;
     Wherein said scavenger comprises a compound of the following formula (I):

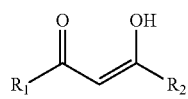

(I)

wherein,
  R1 and R2 are independently of one another selected from —OR3, R4, or from the group consisting of hydroxy, ether, halogen, carbonyl, carboxyl, isocyanate, nitro and/or amine groups,
  $R_3$ and $R_4$ are independently of one another selected from a combination of linear, branched, saturated, unsaturated, cyclic araliphatic hydrocarbons, aromatic hydrocarbons and mixtures thereof, optionally interrupted by one or more oxygen atoms, nitrogen atoms and/or sulphur atoms, and optionally comprising any functional group selected from hydroxy, ether, halogen, carbonyl, carboxyl, isocyanate, nitro and/or amine groups,
  $R_1$ and $R_2$ may be linked to each other essentially forming at least one ring structure, preferably at least 2 ring-structure;
  iii. Curing said reaction mixture, which comprises at least the reaction product of said polyisocyanate and said isocyanate-reactive compound in the presence of said scavenger and said at least one catalyst, leading to the formation of a polyurethane foam.

Preferably, said scavenger predominantly contains said compound with formula (I), when added to the reaction mixture in aqueous condition.

More preferably, said reaction mixture has an NCO index in the range of from about 0.6 to about 1.5, preferably from about 0.8 to about 1.3.

Advantageously, the NCO index of the reaction mixture is in the range of from about 1.05 to about 10, preferably from about 1.05 to about 4.

All the technical features recited above for the reaction mixture can also be combined with the aforementioned technical features recited for the process of the present invention.

Furthermore, the present invention also concerns a method of using the foam obtained by using the reaction mixture of the present invention, in order to form an interior part of transport means.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention Importantly, such phrases do not necessarily refer to the same embodiment.

If the specification states a component or feature "may", "can", "could", or "might" be included or have a characteristic, that particular component or feature is not required to be included or have the characteristic.

In the context of the present invention, the expression 'reaction mixture' should be understood as being a mixture where polyfunctional isocyanate is reacted with isocyanate-reactive compound. This step can be performed according to several embodiments.

In this context, the following options can be cited without being limited thereto:
  Providing the scavenger in an aqueous solution, adding it to the isocyanate-reactive compound and then mixing it with the polyfunctional isocyanate; or
  Providing the scavenger in an aqueous solution and adding it to the reaction mixture, which can comprise the polyfunctional isocyanate and isocyanate-reactive compound; or
  Mixing the scavenger with the isocyanate-reactive compound, eventually in aqueous condition; prior adding it to polyfunctional isocyanate.

According to one embodiment, the polyfunctional isocyanate includes those represented by the formula $Q(NCO)_n$ where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms, wherein aromatic hydrocarbon groups are in general preferred.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups. Those skilled in the art will recognize that it is also possible to use mixtures of the polyfunctional isocyanates described above, preferably using mixture of polymeric MDI, and mixture of MDI isomers.

In another embodiment, prepolymers of MDI can also be used as an alternative of MDI. Prepolymers of MDI are prepared by the reaction of an excess of above mentioned polyfunctional isocyantes (such as an MDI) and a polyfunctional polyol. The prepolymer preferably has an NCO value of 10-30% by weight. The synthesis processes of prepolymers of MDI are known in the art (see for example Polyurethanes Handbook $2^{nd}$ edition, G. Oertel, 1994).

The isocyanate-reactive composition suitable for use in the present disclosure may include polyfunctional polyol or polyfunctional amine.

The polyfunctional polyols for use in the present disclosure may include, but are not limited to, polyether polyols, polyester polyols, bio renewable polyols, polymer polyols, a non-flammable polyol such as a phosphorus-containing polyol or a halogen-containing polyol. Such polyols may be used alone or in suitable combination as a mixture.

General functionality of polyfunctional polyols used in the present disclosure is from 2 to 6. The molecular weight of polyols may be in an amount ranging from 200 to 10,000, preferably from 400 to 7,000.

Molecular weight (MW) is weight average molecular weight which is defined by Gel Permeation Chromatography (GPC) method with polystyrene as a reference.

The proportion of said polyfunctional polyols is generally in an amount ranging from 10% to 90% by weight, preferably from 30% to 80% based on the total weight of the reaction mixture.

Polyether polyols for use in the present disclosure include alkylene oxide polyether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols for use in the present disclosure include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present disclosure may also include: linear or lightly branched aliphatic (mainly adipates) polyols with terminal hydroxyl group; low molecular weight aromatic polyesters; polycaprolactones; polycarbonate polyol. Those linear or lightly branched aliphatic (mainly adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol. Those low molecular weight aromatic polyesters include products derived from the process residues of dimethyl terephalate (DMT) production, commonly referred to as DMT still bottoms, products derived from the glycolysis of recycled poly(ethyleneterephthalate) (PET) bottles or magnetic tape with subsequent re-esterification with di-acids or reaction with alkylene oxides, and products derived by the directed esterification of phthalic anhydride. Polycaprolactones are produced by the ring opening of caprolactones in the presence of an initiator and catalyst. The initiator includes ethylene glycol, diethylene glycol, propylene glycol, dipropylene glycol, 1,4-butane diol, 1,6-hexane diol, glycerol, trimethylolpropane and pentaerythritol. Polycarbonate polyols are derived from carbonic acid—that can be produced through the polycondensation of diols with phosgene, although transesterification of diols, commonly hexane diol, with a carbonic acid ester, such as diphenylcarbonate.

Bio renewable polyols suitable for use in the present disclosure include castor oil, sunflower oil, palm kernel oil, palm oil, canola oil, rapeseed oil, soybean oil, corn oil, peanut oil, olive oil, algae oil, and mixtures thereof.

Examples of polyfunctional polyols also include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol.

The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrine or trichlorobutylene oxide.

The polyfunctional amine for use in the present disclosure may include polyether polyamine or polyester polyamine.

In a preferred embodiment, the isocyanate-reactive composition is polyether polyol.

In the present disclosure, catalyst can be used, in order to speed up the reaction between polyfunctional isocyanate and polyfunctional polyol, for example, amine catalyst e.g. N,N-dimethylethanolamine, N,N-dimethyl-N',N'-di(2-hydroxypropyl)-1,3-propanediamine, 2-((2-(2-(dimethylamino)ethoxy)ethyl)methylamino) ethanol, dimethylcyclohexylamine and triethylene diamine.

In one embodiment, the proportion of the catalysts present in the composition is in an amount ranging from 0.001 to 10 wt %, preferably from 0.1 to 5 wt % based on the total weight of the reaction mixture.

It is found that adding the scavenger in the reaction mixture of the present disclosure can reduce the aldehyde emission in the final product, that can be a rigid or flexible foam.

The scavenger of the present invention is preferably made of compound of formula (I), which can be for instance, without being limited thereof:

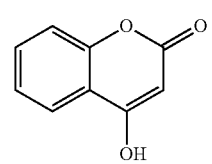

(1)

4-hydroxycoumarin (CAS registry number: 1076-38-6),

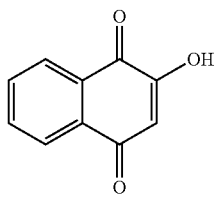

(2)

2-hydroxy-1,4-naphthoquinone (CAS registry number: 83-72-7),

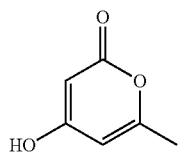

(3)

4-hydroxy-6-methyl-2-pyrone (CAS registry number: 675-10-5), and

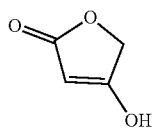

(4)

4-hydroxy-2,5-dihydrofuran-2-one (CAS registry number: 541-57-1).

It should be noted that the scavenger is preferably provided in solid form and can predominantly contains the compound with formula (I). When the scavenger is in aqueous condition, the scavenger preferably contains predominantly the compound of formula (I) in the reaction mixture. It has been observed that this compound with formula (I) is more stable in view of known scavengers and sufficiently reactive with aldehyde. This is particularly advantageous in the context of the invention, since reduction of aldehyde emission can be guaranteed.

According to a preferred embodiment of the present invention, the scavenger is present by weight percentage in the reaction mixture in an amount ranging from about 0.001 to about 10, preferably from about 0.01 to about 5, and more preferably from about 0.05 to about 2 based on the total weight of the reaction mixture.

The isocyanate index or NCO index or index is the ratio of NCO-groups over isocyanate-reactive hydrogen atoms present in a formulation.

[NCO]
[Active Hydrogen]

In other words, the NCO-index expresses the amount of isocyanate actually used in a formulation with respect to the amount of isocyanate theoretically required for reacting with the amount of isocyanate-reactive hydrogen used in a formulation.

In another embodiment, the reaction mixture may further optionally comprise fire retardants, antioxidants, surfactants, physical or chemical blowing agents, chain extender, cross-linking agent, foam stabilizer, fillers, pigments, or any other typical additives used in PU materials.

Advantages of the disclosed composition may include: (1) reduced aldehyde emission, especially formaldehyde, acetaldehyde and propionaldehyde emission; (2) low cost; and (3) no obvious influence on the mechanic properties of the final foam obtained after curing the reaction mixture.

Furthermore, the present disclosure also provides the method of using the foam composition to form an interior part of a means of transport, preferably an interior cladding of automobiles such as roof cladding, carpet-backing foam, door cladding, steering rings, control knobs and seat cushioning.

Embodiments of the present disclosure can also be applied in other industry areas where the PU foams are used. The PU foam includes flexible PU foam, semi-rigid PU foam, rigid PU foam, viscoelastic PU foam, integral skin PU foam, hydroponic PU foam and alike.

The examples which now follow should be considered exemplary of the present disclosure, and not limitative thereof in any way.

Raw Materials

Polyfunctional Isocyanate: SUPRASEC® 7007 (polymeric MDI). Supplier: Huntsman Corporation, USA;

Polyol A: a trifunctional copolymer of ethylene and propylene oxide with terminal hydroxyl groups derived from glycerol; has a molecular weight around 5,000;

Polyol B: a trifunctional ethylene glycol based polyether polyol; has a molecular weight around 1300;

Foam Stabilizer: TEGOSTAB® B8734 LF2 polymer additive (siloxane based surfactant). Supplier: Evonik;

Catalyst A: JEFFCAT® ZF 10 catalyst (amine catalyst). Supplier: Huntsman Corporation, USA;

Catalyst B: JEFFCAT® DPA catalyst (amine catalyst). Supplier: Huntsman Corporation, USA;

Catalyst C: dimethylethanolamine

Scavenger A: 4-hydroxycoumarin;

Scavenger B: 2-hydroxy-1,4-naphthoquinone;

Scavenger C: 4-hydroxy-6-methyl-2-pyrone

Scavenger D: 4-hydroxy-2,5-dihydrofuran-2-one

Chain Extender: diethanolamine

Examples 1-5

Examples 1-5 were produced with the Polyfunctional Isocyanate as the A Component. The B Components for Examples 1 through 5 are shown in Table 1. All values listed in Table 1 refer to parts by weight of the B Component. Examples 5 is comparative example that contained no aldehyde scavenger.

TABLE 1

| B Component Formulation | Example | | | | |
| --- | --- | --- | --- | --- | --- |
|  | 1 | 2 | 3 | 4 | 5 |
| Polyol A | 91.4 | 91.4 | 91.4 | 91.4 | 91.4 |
| Polyol B | 3 | 3 | 3 | 3 | 3 |
| Foam Stabilizer | 0.5 | 0.5 | 0.5 | 0.5 | 0.5 |
| Catalyst A | 0.2 | 0.2 | 0.2 | 0.2 | 0.2 |
| Catalyst B | 0.5 | 0.5 | 0.5 | 0.5 | 0.5 |
| Catalyst C | 0.4 | 0.4 | 0.4 | 0.4 | 0.4 |
| Scavenger A | 0.3 |  |  |  |  |
| Scavenger B |  | 0.3 |  |  |  |
| Scavenger C |  |  | 0.3 |  |  |
| Scavenger D |  |  |  | 0.3 |  |

TABLE 1-continued

| B Component Formulation | Example | | | | |
|---|---|---|---|---|---|
| | 1 | 2 | 3 | 4 | 5 |
| Chain Extender | 0.5 | 0.5 | 0.5 | 0.5 | 0.5 |
| water | 3.5 | 3.5 | 3.5 | 3.5 | 3.5 |

Procedure

For Examples 1-5, the A and B Components were mixed in the proportion (by weight) of A:B=67.4:100 and at an NCO index of 1 and stirred in a polyethylene container to make the polyurethane foam. The resulting foam composition was rapidly poured into polyethylene bag. The foaming reaction proceeded and the foam was allowed to free rise. The foams are cured for a minimum of 15 minutes at room temperature before being tested, for each formulation about 1 kilogram (kg) foam was made via hand mix foam procedure for micro-scale chamber analysis or VDA276 emission test. The temperature of the test chamber during the test was 65° C. VDA276 (2005 Edition) is a test method from the Verband der Automobilindustrie (website: https://www.vda.de/de).

Results

Formaldehyde Reduction and Mechanic Properties

TABLE 2

| | Example | | | | |
|---|---|---|---|---|---|
| | 1 | 2 | 3 | 4 | 5 |
| formaldehyde emission [1)] [µg/m² · h] | 18 | 33 | 10 | 15 | 198 |
| core density [2)] [kg/m³] | 45 | 46 | 50 | 43 | 50 |
| 40% CLD [2)] [kPa] | 5.7 | 6.0 | 7.6 | 5.4 | 7.0 |
| hysteresis loss CLD [2)] | 28 | 30 | 29 | 29 | 30 |
| tensile strength at break [2)] | 105 | 111 | 166 | 116 | 152 |
| elongation at break [2)] | 76% | 75% | 97% | 74% | 82% |
| 50% compression set [2)] | 13% | 9% | 13% | 13% | 10% |

[1)] Tested by micro-scale chamber analysis according to ISO 12219-3:2012
[2)] Tested according to TL526 53 at 23° C. and 50% relative humidity Table 2 shows the reduction in formaldehyde emission for Examples 1-4 as tested according to the ISO 12219-3:2012 method. When aldehyde scavenger is present (Examples 1-4), there is a significant reduction in formaldehyde emission compared to Examples 5 (no scavengers). And there is no obvious influence on the mechanic properties of the foams.

Formaldehyde, Acetaldehyde and Propionaldehyde Reduction

TABLE 3

| | Example | | |
|---|---|---|---|
| | 1 | 3 | 5 |
| formaldehyde emission [1)] [µg/m³] | 14 | 8 | 295 |
| acetaldehyde emission [1)] [µg/m³] | 20 | 16 | 67 |
| propionaldehyde emission [1)] [µg/m³] | 58 | 36 | 140 |

[1)] Tested according to VDA276

Table 3 shows the formaldehyde, acetaldehyde and propionaldehyde emission for Examples 1, 3, and 5 as tested according to the VDA276 method. Examples 1 and 3 of the present disclosure show a reduction of formaldehyde, acetaldehyde and propionaldehyde emission over Example 5 (no aldehyde scavengers).

The invention claimed is:

1. A reaction mixture for the manufacturing of a polyurethane foam, the reaction mixture comprising a polyfunctional isocyanate, an isocyanate-reactive compound, a scavenger and at least one catalyst, wherein the scavenger comprises a compound of the following formula (I):

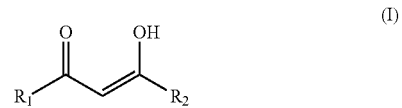

(I)

wherein, $R_1$ and $R_2$ are independently of one another selected from —$OR_3$, $R_4$ or from the group consisting of hydroxy, ether, halogen, carbonyl, carboxyl, isocyanate, nitro and/or amine groups, $R_3$ and $R_4$ are independently of one another selected from a combination of saturated linear, saturated branched, cyclic and/or saturated non-cyclic carbon chains, saturated aliphatic hydrocarbons, araliphatic hydrocarbons, aromatic hydrocarbons and mixtures thereof, optionally interrupted by one or more oxygen atoms, nitrogen atoms and/or sulphur atoms, and optionally comprising any functional group selected from hydroxy, ether, halogen, carboxyl, isocyanate, nitro and/or amine groups, $R_1$ and $R_2$ may be linked to each other essentially forming at least one ring structure.

2. The reaction mixture according to claim 1, wherein said compound with formula (I) is in an aqueous condition when added to the reaction mixture.

3. The reaction mixture according to claim 1, wherein said scavenger is added to the reaction mixture at a temperature ranging from 18 to 45° C.

4. The reaction mixture according to claim 1, wherein $R_1$ is —$OR_3$.

5. The reaction mixture according to claim 1, wherein said scavenger is made of at least 90 wt % of said compound of formula (I) based on the total weight of said scavenger.

6. The reaction mixture according to claim 1, wherein $R_1$ and $R_2$ are linked to each other to form a 5 to 12 membered ring structure and comprise unsaturations, aromatic rings and/or heteroatoms.

7. The reaction mixture according to claim 1, wherein said scavenger has a molecular weight of at most 3000 g/mol.

8. The reaction mixture according to claim 1, wherein the reaction mixture further comprises a blowing agent.

9. The reaction mixture according to claim 1, wherein the polyfunctional isocyanate is selected from a polymeric methylene diphenyl diisocyanate, a methylene diphenyl diisocyanate isomer mixture, or a mixtures thereof.

10. The reaction mixture according to claim 1, wherein the isocyanate-reactive compound is a polyfunctional polyol or a polyfunctional amine.

11. A process for the manufacturing of a polyurethane foam, comprising the following steps:
(a) providing a reaction mixture comprising a polyfunctional isocyanate and an isocyanate-reactive compound;
(b) adding a scavenger and at least one catalyst to said reaction mixture, then adding at least one blowing agent to the reaction mixture;

wherein said scavenger comprises a compound of the following formula (I):

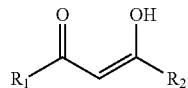

wherein,

R₁ and R₂ are independently of one another selected from —OR₃, R₄, or from the group consisting of hydroxy, ether, halogen, carbonyl, carboxyl, isocyanate, nitro and/or amine groups, R₃ and R₄ are independently of one another selected from a combination of saturated linear, saturated branched, cyclic and/or saturated non-cyclic carbon chains, saturated aliphatic hydrocarbons, araliphatic hydrocarbons, aromatic hydrocarbons and mixtures thereof, optionally interrupted by one or more oxygen atoms, nitrogen atoms and/or sulphur atoms, and optionally comprising any functional group selected from hydroxy, ether, halogen, carboxyl, isocyanate, nitro and/or amine groups, R₁ and R₂ may be linked to each other essentially forming at least one ring structure; and (c) curing said reaction mixture, which comprises at least the reaction product of said polyisocyanate and said isocyanate-reactive compound in the presence of said scavenger and said at least one catalyst, leading to the formation of a polyurethane foam.

12. The process according to claim 11, wherein said compound with formula (I) is in an aqueous condition when added to the reaction mixture.

13. The process according to claim 11, wherein, said reaction mixture has an NCO index in the range of from about 0.6 to about 1.5.

14. The process according to claim 11, wherein, the NCO index of the reaction mixture is in the range of from about 1.05 to about 10.

* * * * *